(12) United States Patent
Kimura

(10) Patent No.: US 6,831,760 B2
(45) Date of Patent: Dec. 14, 2004

(54) IMAGE READING APPARATUS

(75) Inventor: Koji Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 09/800,654

(22) Filed: Mar. 8, 2001

(65) Prior Publication Data

US 2001/0033397 A1 Oct. 25, 2001

(30) Foreign Application Priority Data

Mar. 9, 2000 (JP) .......................... 2000-071042
Feb. 22, 2001 (JP) .......................... 2001-047055

(51) Int. Cl.$^7$ .............................. H04N 1/04; H04N 1/00
(52) U.S. Cl. ........................ 358/483; 358/474; 358/406
(58) Field of Search ................... 358/483, 482, 358/471, 474, 400, 500, 505, 514, 512, 513, 406, 504, 473, 472; 250/208.1, 216; 382/312, 313; 359/819, 822; 348/294, 272, 208.7, 190

(56) References Cited

U.S. PATENT DOCUMENTS 4,167,546 A * 9/1979 Korshak et al. ............ 525/275
5,075,539 A * 12/1991 Shiraishi ................... 250/208.1
5,715,099 A * 2/1998 Takemoto ................... 359/819
5,933,248 A * 8/1999 Hirata ......................... 358/406
6,073,844 A * 6/2000 Tsai et al. ................... 235/439
6,157,467 A * 12/2000 Tsai ........................... 358/483
6,239,885 B1 * 5/2001 Sato et al. ................... 358/483
6,465,769 B1 * 10/2002 Sakurai ...................... 250/216
6,473,205 B1 * 10/2002 Pepe .......................... 358/483
6,621,522 B1   9/2003 Chang et al. ................ 348/374

* cited by examiner

Primary Examiner—Cheukfan Lee
(74) Attorney, Agent, or Firm—Fitzpatrick, Cella, Harper & Scinto

(57) ABSTRACT

An image reading unit which is attached onto an image reading apparatus includes a first unit having a photoelectric conversion device for photoelectrically converting the image information of an original, and a second unit which can be engaged with the first unit, wherein the first unit is engaged with the second unit, and after a first plane portion provided in the first unit and a second plane portion provided in the second unit are brought in close contact with each other, the first unit is fixed to the second unit with an adhesive, and wherein a groove into which the adhesive is poured is formed in at least one of the regions where the first plane portion and the second plane portion are adhered to each other.

32 Claims, 18 Drawing Sheets

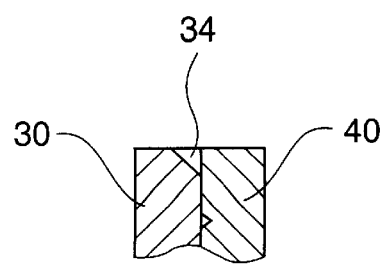
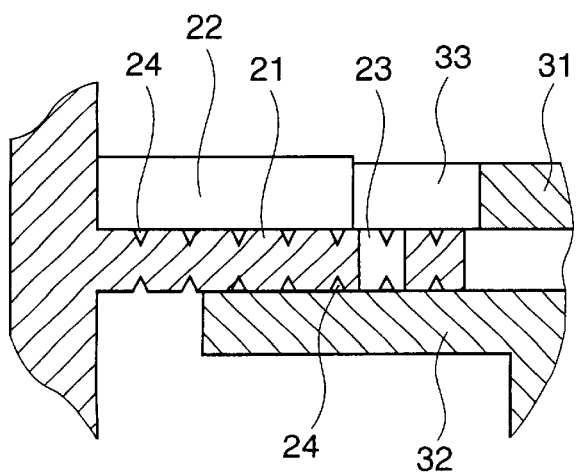
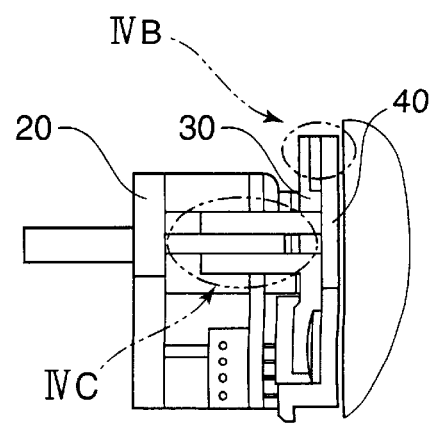

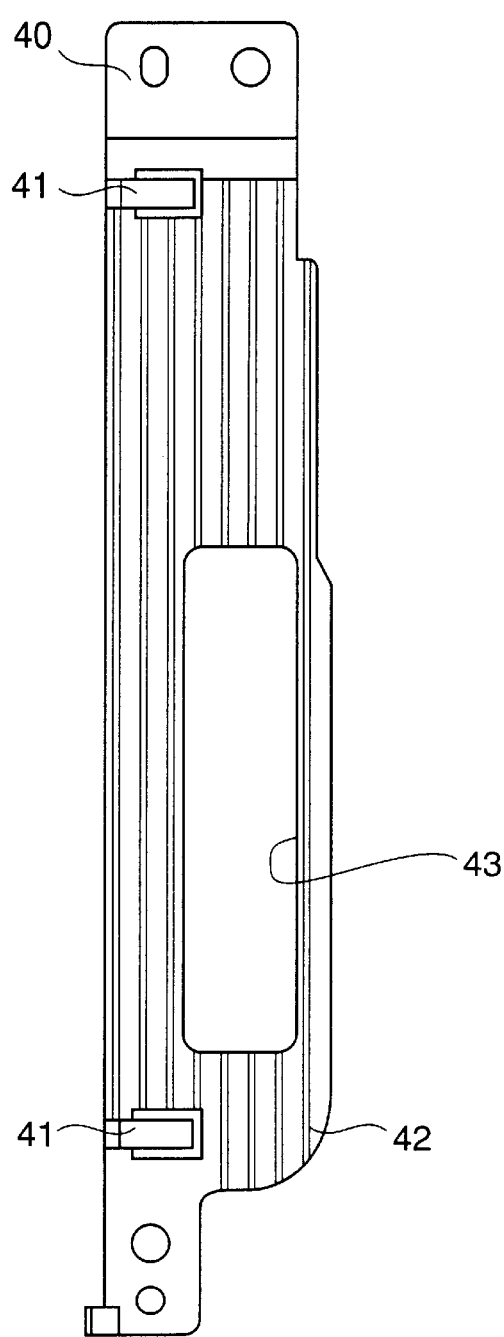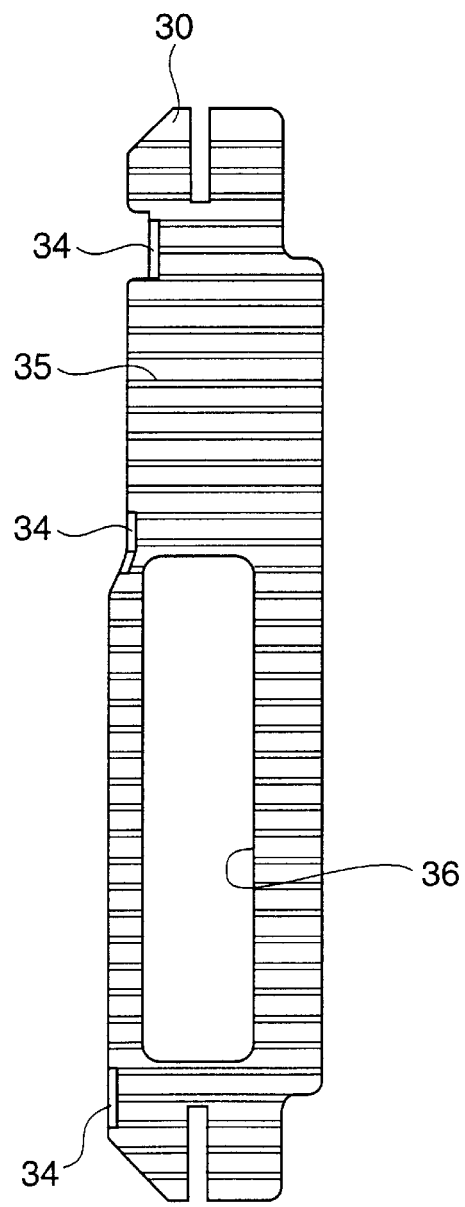

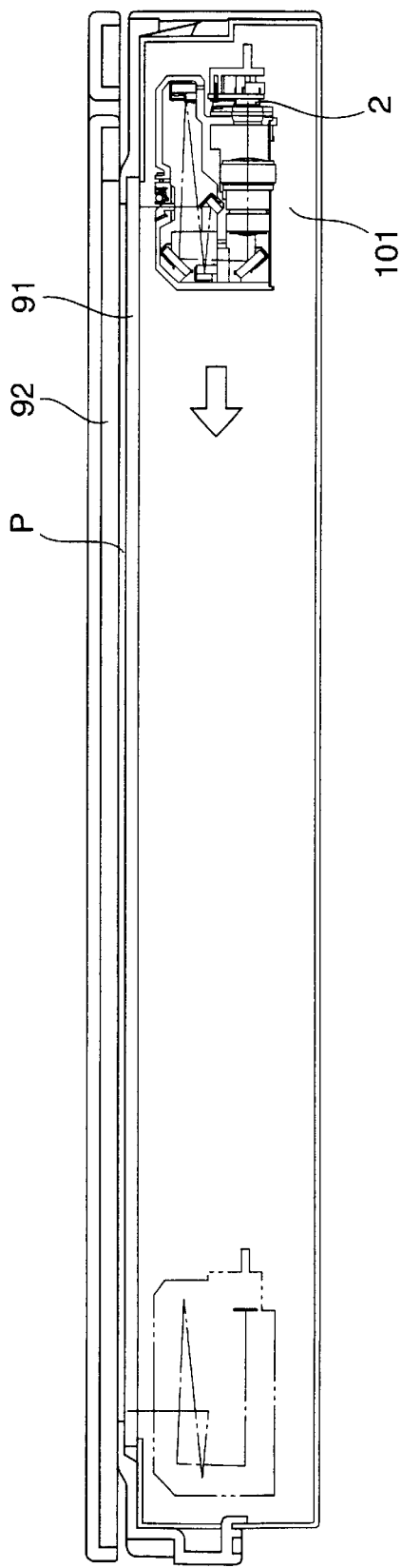

IMAGE READING APPARATUS

BACKGROUND OF THE INVENTION

1. Field of the Invention

The present invention relates to an image reading unit that reads an original image, for example, a scanner, a copying machine, a facsimile machine, or the like and an image reading apparatus having the image reading unit.

2. Related Background Art

Up to now, various image reading apparatuses such as an image scanner which reads the image information of an original and forms digital image information have been put into practical use.

In recent years, as the image reading apparatus of this type, an all-in-one optical system unit that can simplify the structure as the entire apparatus and complete an optical adjustment only within the unit is used a lot, although the image reading unit (carriage) per se becomes large.

An example of the image reading apparatus that reads an original by using the image reading unit (carriage) which is the all-in-one optical system unit will be described with reference to FIGS. 16 to 18. FIG. 18 is a schematic cross-sectional view showing the image reading apparatus.

In order to read the image information, an original P is set on an original glass stand 91 and the original P is set at a regular position with its image side facing inward of an apparatus case, that is, facing downward, and an original pressure plate 92 pushes a back side of the original P from the upper side so as not to displace the original P on the original glass stand 91.

An image reading unit (carriage) 101 having photoelectric conversion means (an image sensor) which is disposed opposite to the original P with the original glass stand 91 interposed therebetween is so structured as to read image information for one straight line (image information obtained by main scanning for one line), and in order to read the image information of the original P, the image reading unit 101 is moved in parallel in a sub-scanning direction from a leading end of the original P to a trailing end thereof by a drive motor (not shown). With the above structure, the image reading unit 101 can read a two-dimensional plane image of the original image.

FIG. 17 shows an enlarged cross-sectional view showing the image reading unit (carriage) 101, and FIG. 16 shows a basic structural diagram of the image reading unit (carriage) (a lamp and so on are omitted).

A lamp 3 that serves as a light source, a reflecting mirror (reflector) 4 disposed on a back side of the lamp 3 and a reflecting mirror (reflector) 5 disposed in the vicinity of the lamp 3 lightens a required portion of the original P in a linear manner in a main scanning direction.

The original glass stand 91 on which the original P is set is omitted from the figure.

The light reflected from the image surface of the original P is guided to a lens unit 11 that images an optical image through a first mirror 6, a second mirror 7, a third mirror 8, a fourth mirror 9 and a fifth mirror 10 which are optical mirrors, and the original image is imaged on an image sensor 2 that serves as the photoelectric conversion means.

The image sensor 2 is so designed as to conduct a photoelectric conversion to form the image information.

Then, after the data for one line is processed, the image reading unit (carriage) 101 is moved in a sub-scanning direction by only one line, to prepare the image information in the above manner, and this operation is repeated.

Also, there is a case in which the illuminance of the light from the light source 3 toward the original P becomes uneven in the main scanning direction or the characteristics of each pixel of the image sensor 2 are different from each other. As a result, any discrepancies in producing the image information becomes wide.

In order to correct the discrepancies, shading correction of white and black is required, and a white reference plate for white shading and a black reference plate for black shading are disposed at positions where the image reading unit (carriage) 101 can shade on the extension line of the sub-scanning direction and out of an original image reading range, respectively.

However, the above-described conventional art suffers from the following problems.

As is apparent from the above description, since the optical adjustment of the image reading unit (carriage) is conducted only within the unit, an image sensor with a higher resolution image can be used.

In order to sufficiently exhibit the efficiency of the image sensor with the high-resolution image, the performance of the lens unit which is another important part of the image sensor must be suited for the image sensor for the high resolution image.

Therefore, there arises such a problem that if the technical precision of the optical adjustment is not very high, the capacity of the high resolution image sensor and the high performance lens unit cannot be effected.

Since the image sensor is normally fixed to the carriage by soldering or the like so as to be disposed within a free space, even if an assembling adjustment jig with a high precision or the like is used in order to forcedly enhance the technical precision of the optical adjustment, slight displacement may occur at the time of finally fixing the image sensor by soldering or the assembling property is remarkably deteriorated.

Also, in the case where the optical adjustment failure occurs, the original image reading fails or it takes too much time to recycle the image reading unit.

SUMMARY OF THE INVENTION

The present invention has been made to solve the above problem with the conventional art, and therefore an object of the present invention is to provide an image reading unit and an image reading apparatus which improves the adhesion when a first unit having photoelectric conversion means is adhered to a second unit with an adhesive.

Another object of the present invention will become by reading the following detailed description.

BRIEF DESCRIPTION OF THE DRAWINGS

These and other objects, features and advantages of the present invention will become more apparent upon consideration of the following description of the preferred embodiments of the present invention taken in conjunction with the accompanying drawings.

FIG. 4A is a front side view of the lower front view of FIG. 1, and FIGS. 4B and 4C are enlarged cross-sectional views of the encircled portions IVB and IVC shown in FIG. 4A;

FIGS. 14A and 14B are diagrams for explaining the adhering surfaces of the second fixing member and a third fixing member;

FIG. 18 is a schematic cross-sectional view showing an image reading apparatus.

DETAILED DESCRIPTION OF THE PREFERRED EMBODIMENTS

Now, a description will be given in more detail of a preferred embodiment of the present invention with reference to the accompanying drawings. The dimensions, the material, the configuration and the relative arrangement, etc., of the structural parts disclosed in this embodiment may be appropriately altered in accordance with the structure of an apparatus and various conditions to which the present invention is applied, and the scope of the present invention is not limited to the following embodiment. The same structural parts as those described in the description of the related art is designated by identical references, and their description will be omitted.

Figure 16:
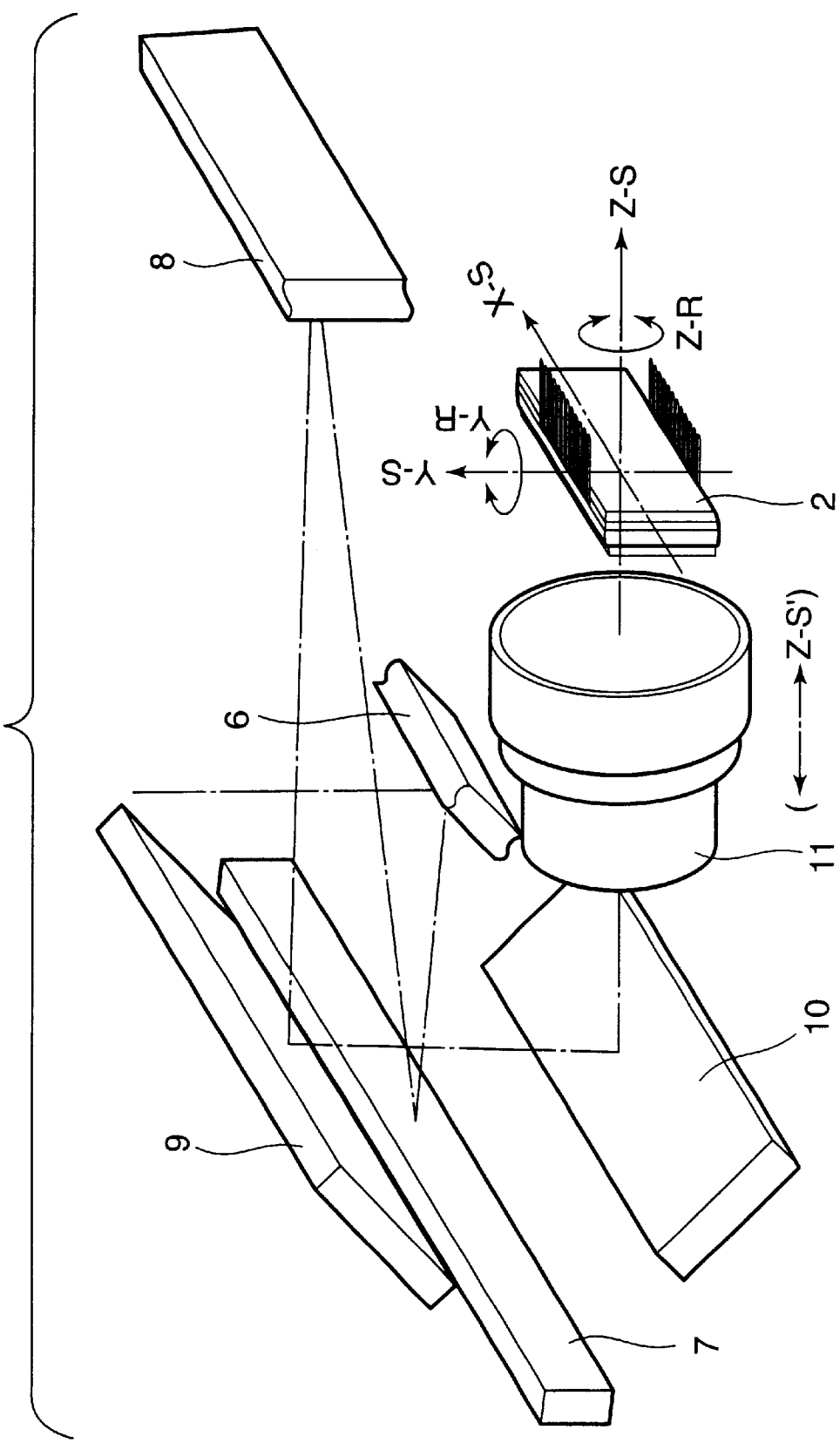
FIG. 16 is a basic structural diagram showing an image reading unit (carriage)

First, before description of an embodiment, the degree of freedom for adjusting an image sensor that serves as photoelectric conversion means with respect to an image reading unit main body will be described briefly with reference to the basic structural view shown in FIG. 16.

It is considered that a straight line of the image information of an original P in a main scanning direction is focused on a straight line element of an image sensor that serves as photoelectric conversion means.

The center optical path (optical axis) is indicated by an alternate long and short dash line, and the optical path (optical axis) is reflected by a first mirror 6, a second mirror 7, a third mirror 8, a fourth mirror 9 and a fifth mirror 10 so as to be bent, and then guided to a lens unit 11 that images an optical image.

The respective optical mirrors 6 to 10 are fixed to a carriage main body at predetermined positions so that the adjustment is not required. The lens unit 11 is movable with respect to the optical path (optical axis) in the longitudinal direction (Z-S' direction) for adjustment of the magnification, and the like.

A direction for adjustment movement of the image sensor 2 is determined.

It is assumed that the optical path (optical axis) direction is a Z axis, a direction which is orthogonal to the Z axis and superimposed on a direction of elements of the image sensor 2 arranged in a straight line is an X axis, and a direction which is orthogonal to both of the Z axis and the X axis is a Y axis.

Then, the parallel movement in the X axial direction is represented by X-S, the parallel movement in the Y axial direction is represented by Y-S, the parallel movement in the Z axial direction is represented by Z-S, the rotating movement with respect to the Y axial direction is represented by Y-R, and the rotating movement with respect to the Z axis is represented by Z-R.

In this example, although the rotating movement with respect to the X axis is not determined, since the rotating movement is the combination of imaging of a straight line of the image information (reading line segment) and a straight line of the element (imaging line segment), the rotating movement of the straight line (imaging line segment) of the element does not influence the adjustment.

As a result, the image sensor 2 requires five directions as the degree of freedom of adjustment movement with respect to the carriage, and if the degree of freedom of the five directions is ensured, the optical adjustment can be made.

The structure, the configuration, the adjustment, the movement and so on in accordance with this embodiment will be described with reference to FIGS. 1 to 14.

Figure 1:
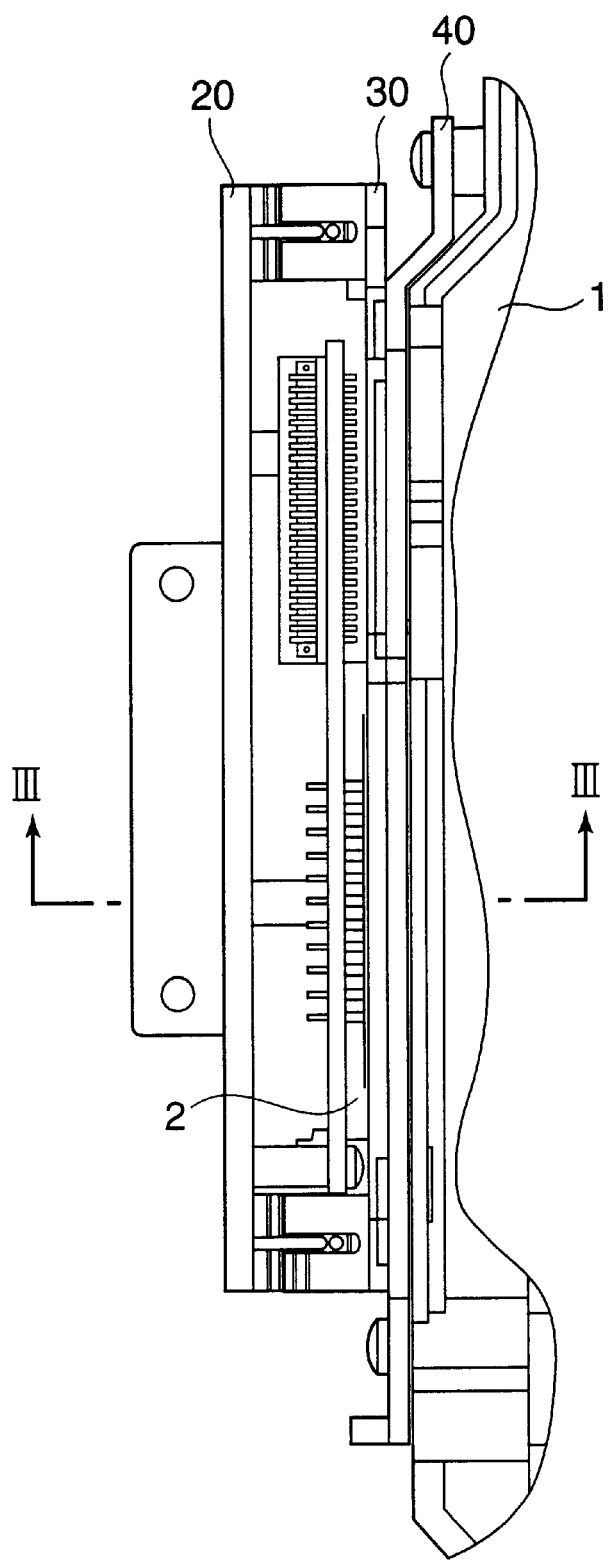
FIG. 1 is a lower front view showing a part of a carriage enlarged cross-sectional view in FIG. 17 viewed from the lower.
Figure 2:
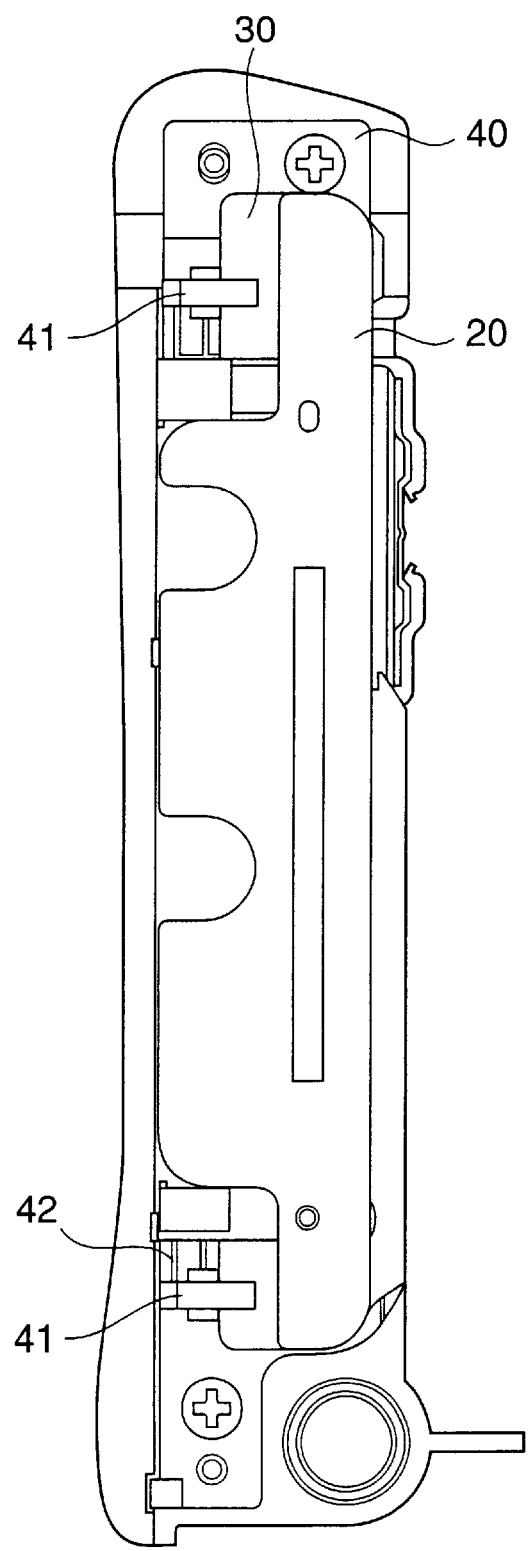
FIG. 2 is a left side view of the lower front view shown in FIG. 1.
Figure 3:
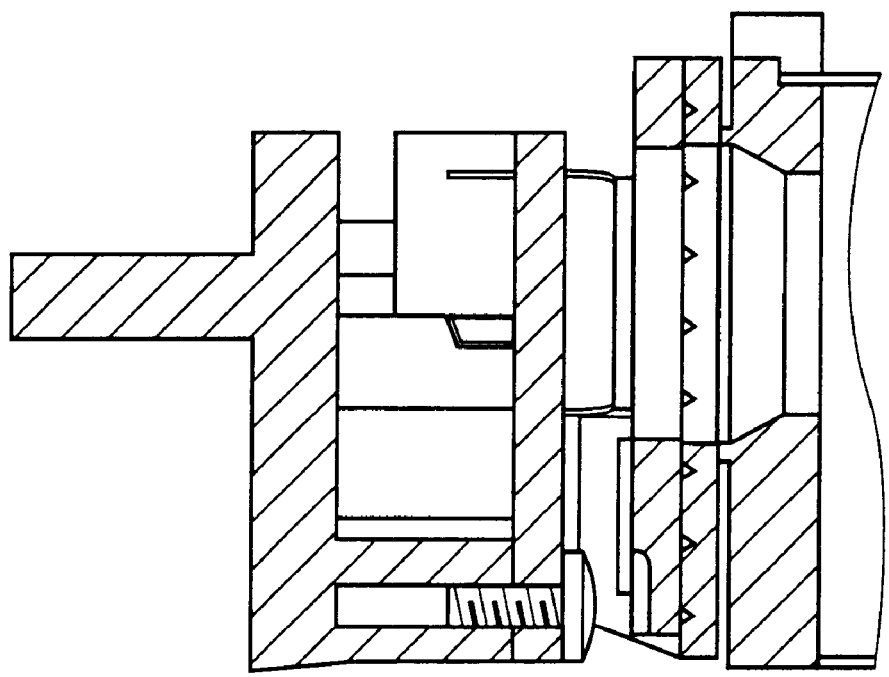
FIG. 3 is a front cross-sectional view taken along a line III—III of the center portion of the lower front view shown in FIG. 1.
Figure 17:
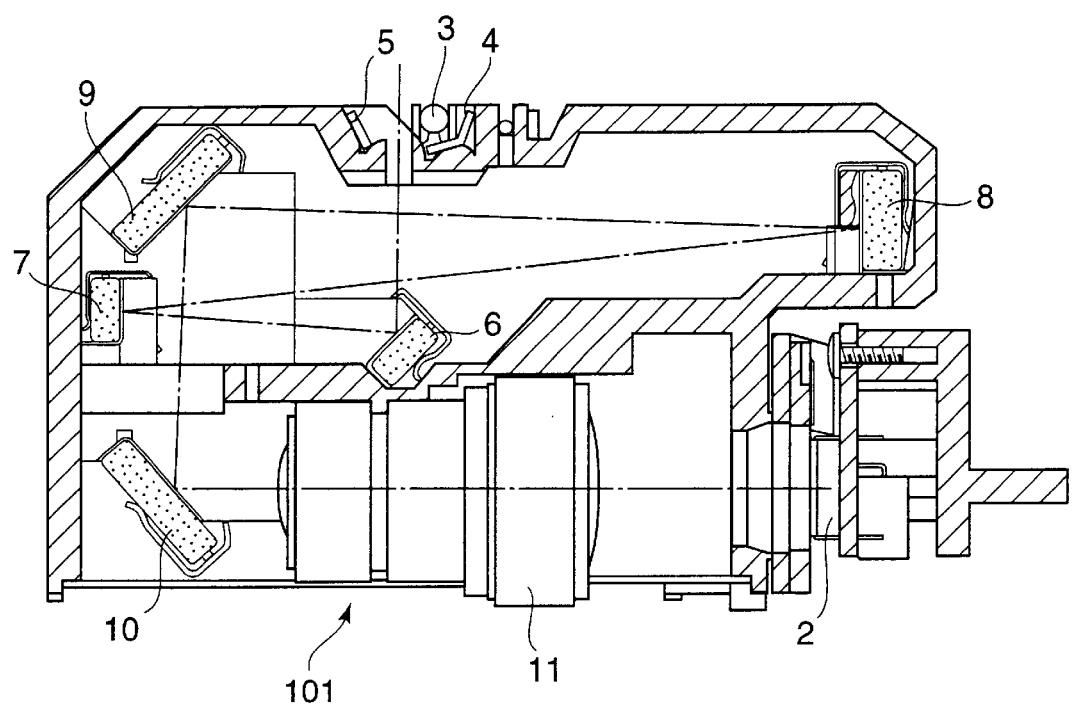
FIG. 17 is an enlarged cross-sectional view showing the image reading unit (carriage)

FIG. 1 is a lower front view showing a part of a carriage enlarged cross-sectional view in FIG. 17 viewed from the lower. FIG. 2 is a left side view of the lower front view shown in FIG. 1. FIG. 3 is a front cross-sectional view taken along a line III—III of the center portion of the lower front view shown in FIG. 1. FIG. 4A is a front side view of the lower front view of FIG. 1, and FIGS. 4B and 4C are enlarged cross-sectional views of the encircled portions IVB and IVC shown in FIG. 4A.

As is apparent from the figures, the optical adjustment according to this embodiment is conducted by inverting the cartridge 1, the entire appearance of the final assembling structure after the optical adjustment and the image sensor adhering process is shown in the figures.

An adhesive used in this embodiment is made up of an instantaneous adhesive which saves a period of time required for the assembling process, and is described as the adhesive in the specification for explanation.

The advantages of the instantaneous adhesive used in this embodiment is that the management of the adhesive is simple as compared with soldering and so on, the adhesive is diffused due to the surface tension so as to broaden an area of the adhering surface, and moreover the assembling period of time can be shortened.

Also, as compared with the use of a conventional ultraviolet curing adhesive, although a portion that becomes a shadow to which the ultraviolet ray cannot be irradiated from the exterior cannot be adhered, the instantaneous adhesive flows into the portion which becomes the shadow and can firmly adhere to that portion.

Figure 5:
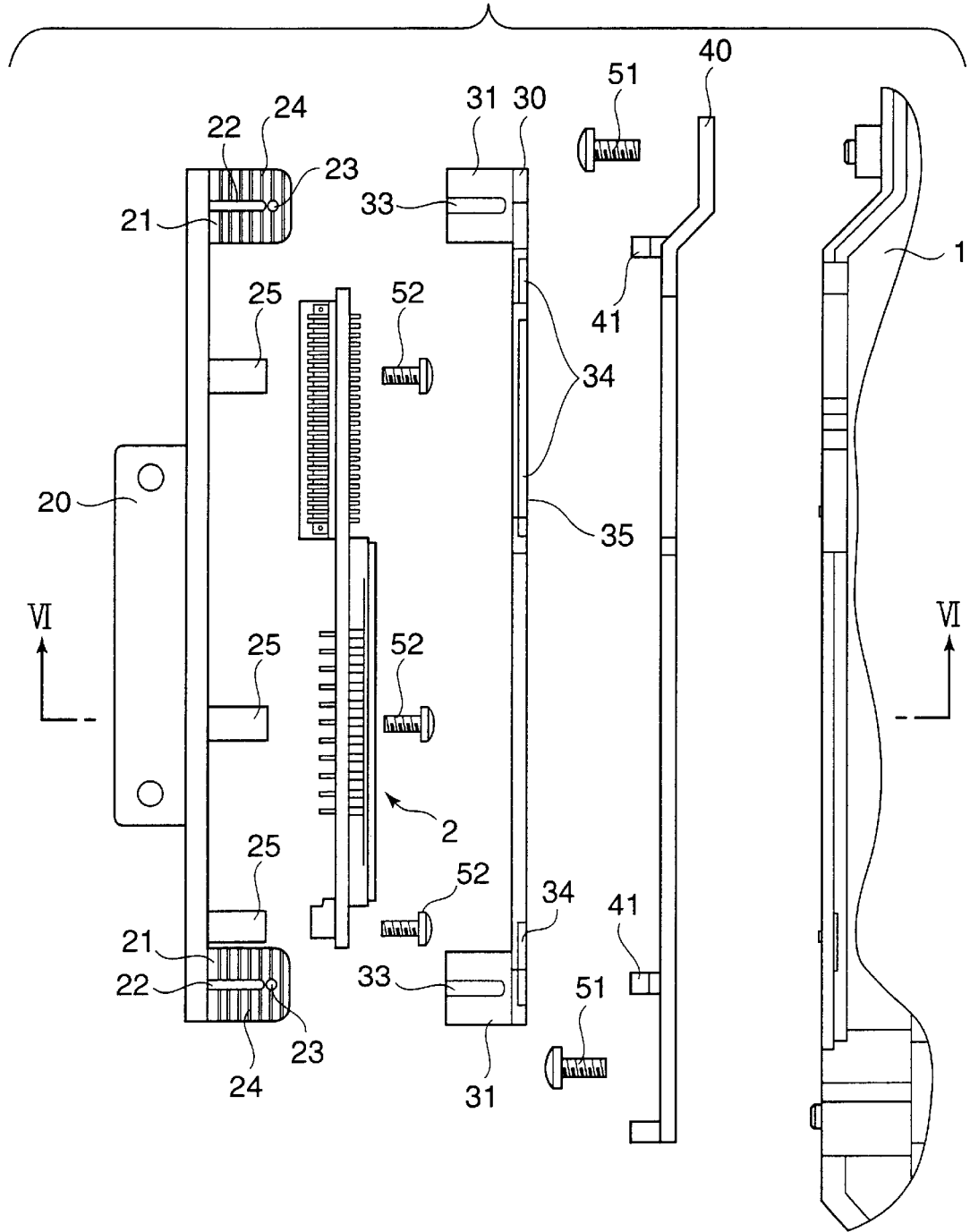
FIG. 5 is a diagram of the respective single parts of the lower front view shown in FIG. 1.
Figure 6:
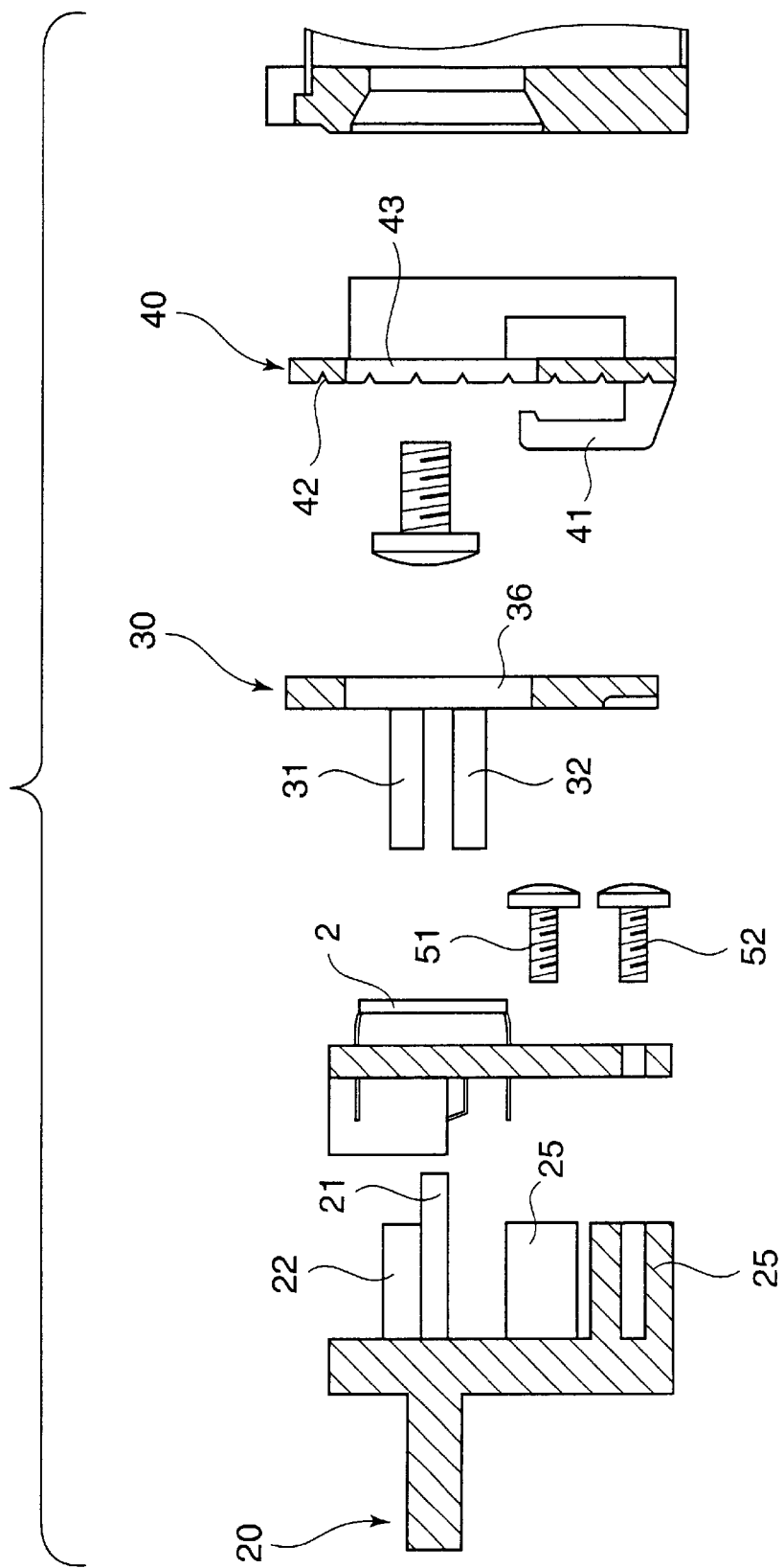
FIG. 6 is a front cross-sectional view taken along a line VI—VI of the center portion of the single parts diagram shown in FIG. 5.
Figure 7:
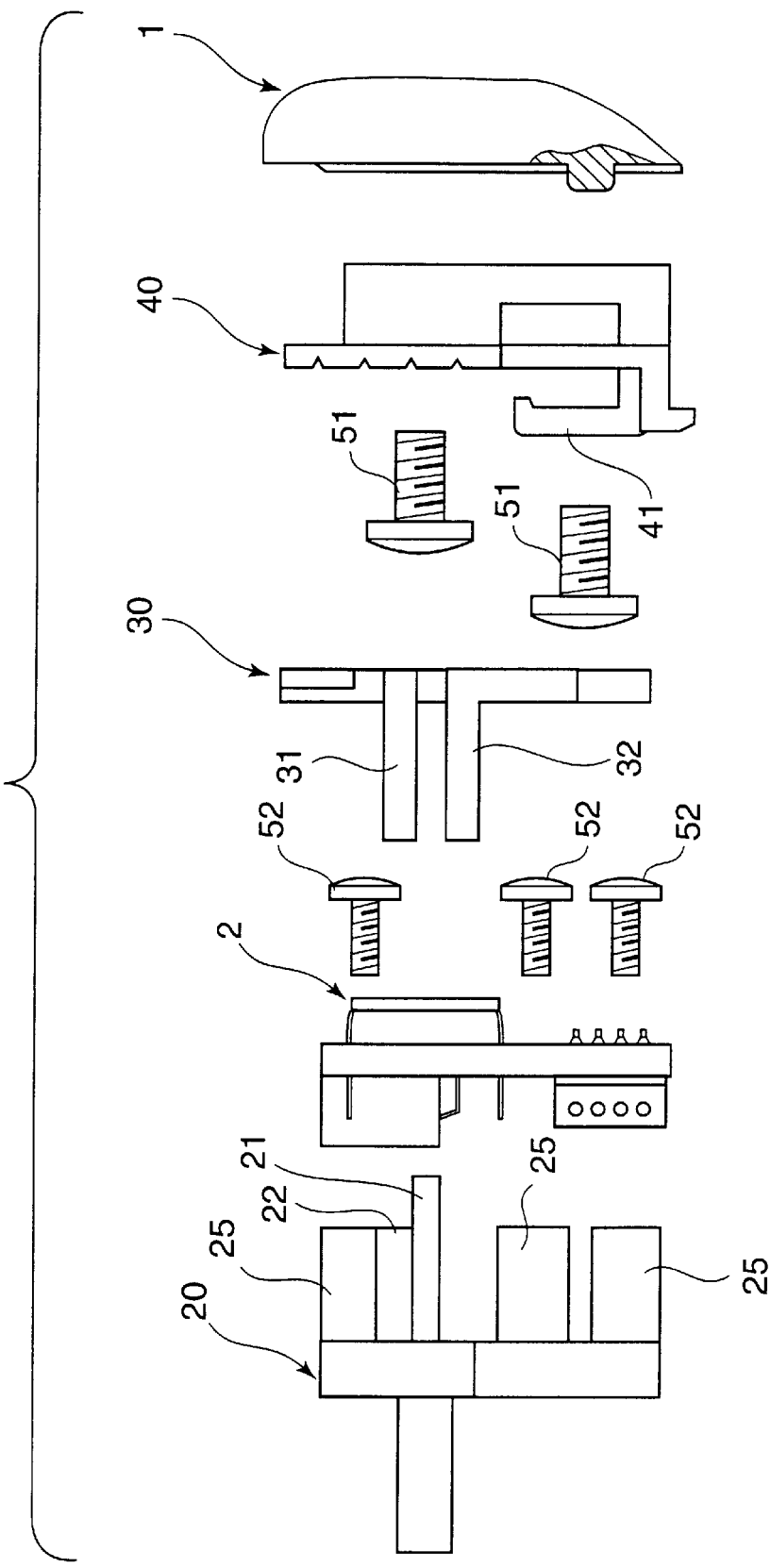
FIG. 7 is a front side view of the single parts diagram shown in FIG. 5.

FIG. 5 is a diagram of the respective single parts of the lower front view shown in FIG. 1, FIG. 6 is a front cross-sectional view taken along a line VI—VI of the center portion of the single parts diagram shown in FIG. 5, and FIG. 7 is a front side view of the single parts diagram shown in FIG. 5.

The photoelectric conversion unit and a first slide contact portion that serves as an adjusting member which comes in slide contact with the second fixing member 30 will be described.

Figure 15A:
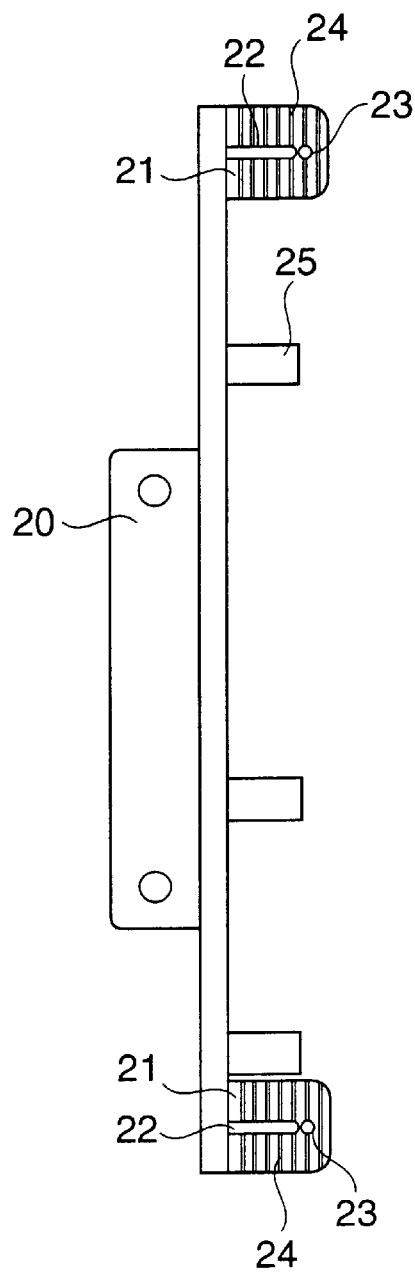
FIGS. 15A and 15B are diagrams for explaining the adhering surfaces of the first fixing member and the second fixing member.
Figure 15B:
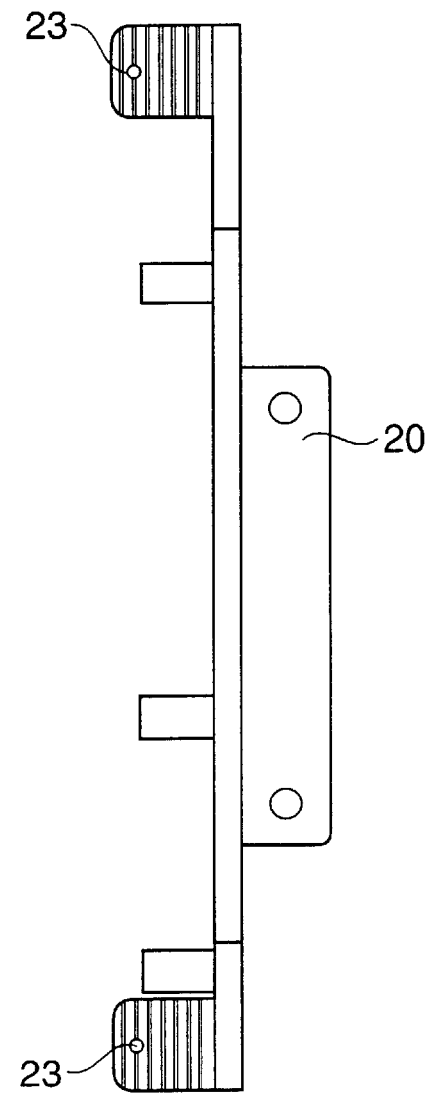

As shown in FIGS. 15A and 15B, the first fixing member 20 that constitutes the photoelectric conversion unit in association with the image sensor 2 includes two adhesive plate portions (extended portion) 21 for adhering to the second fixing member (adjusting portion) 30 as the adjusting member on both ends thereof. FIG. 15A is a plan view showing the first fixing member 20, and FIG. 15B is a bottom view showing the first fixing member 20.

Each of those two adhesive plate portions 21 includes an engagement rib 22 (substantially T-shaped portion in cross section) for engaging with the second fixing member 30, an adhesive hole portion 23 through which the adhesive flows to the back surface of the adhesive plate portion 21, and an adhesive groove portion 24 through which the adhesive is uniformly spread to the adhesive plate portion 21. The adhesive groove portion 24 is also formed on the back surface of the adhesive plate portion 21.

In order to increase the intelligibility of the invention, the size of the adhesive groove portion 24 is shown in FIGS. 4B and 4C in an exaggerated form. The size and the configuration of the adhesive groove portion 24 are not limited to the illustrated size and configuration.

The image sensor 2 is disposed on an electric substrate, and fixed to a fixing boss 25 of the first fixing member 20 with a screw (second fastening member) 52 to form the photoelectric conversion unit, and a signal which has been subjected to photoelectric conversion is sent through a flexible electric cable not shown.

The second fixing member 30 includes two adhesive plate portions 31 and 32 (an engaging portion and a swing surface portion) which come in slide contact with both of the front and the back surfaces of the adhesive plate portion 21 of the first fixing member 20 and adhere thereto on both ends thereof.

Each of those two adhesive plate portions 31 has an engagement receiving portion 33 for engaging with the engagement rib 22 of the first fixing member 20, and the adhesive plate portion 32 positioned below the engagement receiving portion 33 is planar and has no such engagement receiving portion.

The second fixing member 30 that serves as an adjusting member and a second slide contact portion (adhering portion due to the adhesive) which comes in slide contact with a third fixing member 40 which serves as a frame will be described.

As shown in FIG. 14B, the second fixing member 30 has an adhering surface (plane) adhered to the third fixing member 40 and several pouring ports (notch portions) 34 into which the adhesive is poured on a side surface thereof.

Also, an adhesive groove portion 35 for uniformly spreading the adhesive is formed on the adhesive surface. It is preferable that the groove portion 35 extends to the exterior of the adhesive region adhered to the third fixing member 40.

The adhesive that has flown into the adhesive groove portion 35 is spread toward the side surface opposite to the pouring ports 34 with the aid of the surface tension or the like. Also, the groove direction of the adhesive groove portion 35 at the time of adhering is a direction along which the adhesive flows by its self-weight. In this embodiment, the groove portion 35 is linearly formed, but may be so formed as to provide a curvature.

Also, the center portion of the second fixing member 30 has an opening portion 36 broader than the image sensor 2 and does not interfere with the image sensor 2 at the time of assembling adjustment.

The third fixing member 40 has an adhering surface (plane) which comes in slide contact with the side surface of the second fixing member 30 and adheres thereto, and an engagement portion 41 which is engaged with the second fixing member 30 at the back of the second fixing member 30 so that the second fixing member 30 is always in slide contact with the engagement portion 41.

An adhesive groove portion 42 is formed on the slide contact adhering surface of the third fixing member 40, and the groove direction is orthogonal to the adhesive groove portion 35 of the second fixing member 30 (the groove direction crosses in a direction substantially orthogonal to the adhesive groove portion 35 in this embodiment). In this embodiment, it is preferable that the groove portion 42 extends to the external of the adhering region adhered to the second fixing member 30. Also, the groove portion 42 is linearly formed, but may be so formed as to provide a curvature.

In order to increase the intelligibility of the invention, the size of the adhesive groove portion 42 is shown in FIG. 6 in an exaggerated form. The size and the configuration of the adhesive groove portion 42 are not limited to the illustrated size and configuration.

Therefore, in a state where the second fixing member 30 and the third fixing member 40 are engaged with each other by the engagement portion 41, and the adhering surface of the second fixing member 30 and the adhering surface of the third fixing member 40 are in contact with each other, the adhesive poured into the pouring ports 34 is uniformly spread over the entire slide contact adhering surfaces of the second fixing member 30 and the third fixing member 40 with the aid of the surface tension or the like.

Also, the center portion of the third fixing member 40 has an opening portion 43 broader than that of the image sensor 2 as in the center portion of the second fixing member 30 and does not interfere with the image sensor 2 at the time of assembling adjustment.

The third fixing member 40 is fitted and positioned with respect to the carriage 1 main body, and fixed by the screw (first fastening member) 51. A fastening screw 51 is disposed out of the adjustment movement ranges of the first fixing member 20 and the second fixing member 30 or on a step portion shown in FIG. 5 so as to be removable without interfering with other parts even after assembling.

Figure 8:
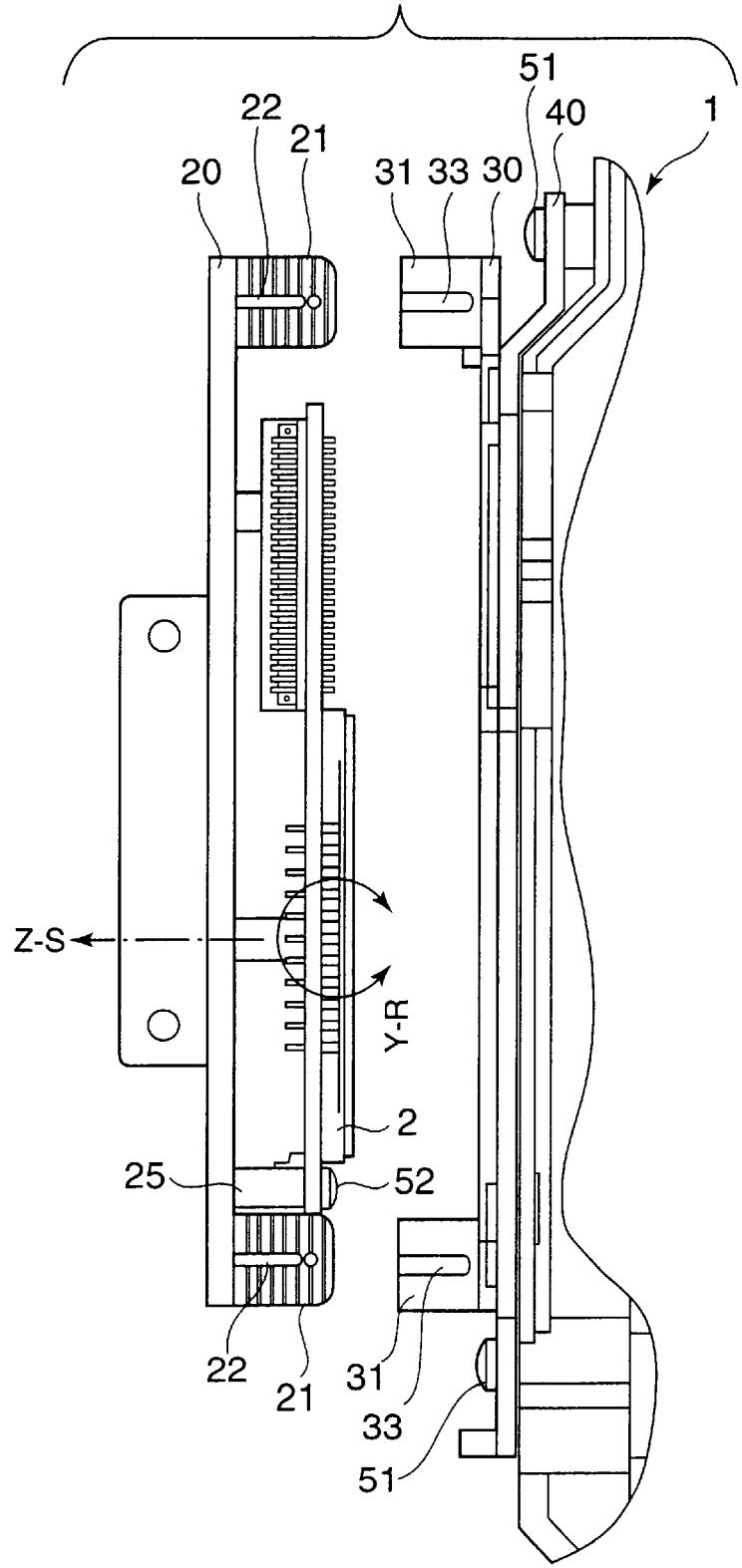
FIG. 8 is a diagram showing a lower front assembly before an adhering process.
Figure 9:
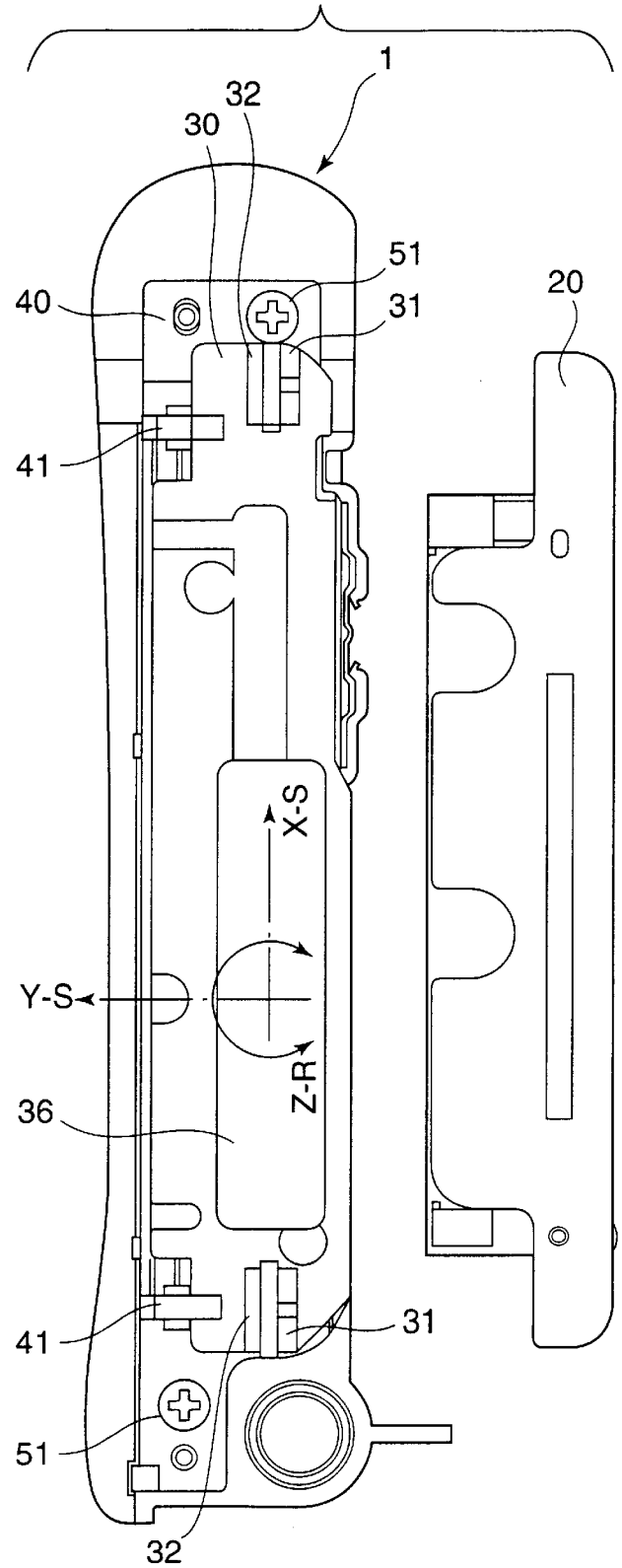
FIG. 9 is a diagram showing a left side assembly before the adhering process.

FIG. 8 is a diagram showing a lower front assembly before an adhering process, and FIG. 9 is a diagram showing a left side assembly before the adhering process.

First, the third fixing member 40 is fitted, positioned and fixed by the screw 51 with respect to the carriage 1 main body side in such a manner that the second fixing member 30 is nipped between the engagement portion 41 and the third fixing member 40 so that the second fixing member 30 is in slide contact with the third fixing member 40.

The electric substrate on which the image sensor 2 is disposed is fixed onto a fixing boss 25 of the first fixing member 20 by the screw 52 to assemble the image sensor unit.

In this situation, the adjustment moving direction of the image sensor 2 is confirmed.

The image sensor unit is integral, and because the adhesive plate portion 21 of the first fixing member 20 and the adhesive plate portions 31 and 32 of the second fixing member 30 can be in slide contact with each other, the adjustment moving directions becomes Z-S (the parallel movement in the Z-axial direction) and YR (rotating movement about the Y axis).

Since the second fixing member 30 and the third fixing member 40 integrated with the carriage 1 main body are merely nipped by the engagement portion 41, they can be in slide contact with each other, and the adjustment moving directions are X-S (the parallel movement in the X-axial direction), Y-S (the parallel movement in the Y-axial direction) and Z-R (the rotating movement with respect to the Z axis).

With the above operation, the degree of freedom in the five directions is ensured, and the optical adjustment can be made.

Figure 10:
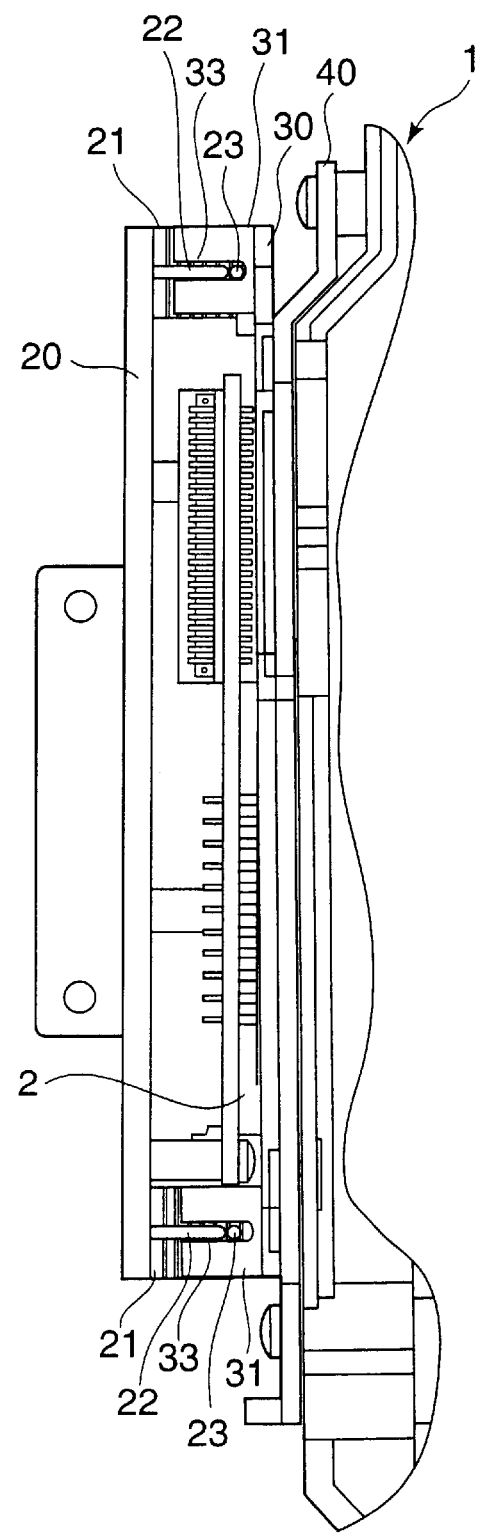
FIG. 10 is a lower front view showing that a first fixing member 20 is moved clockwise of adjustment movement Y-R with respect to a second fixing member 30.
Figure 11:
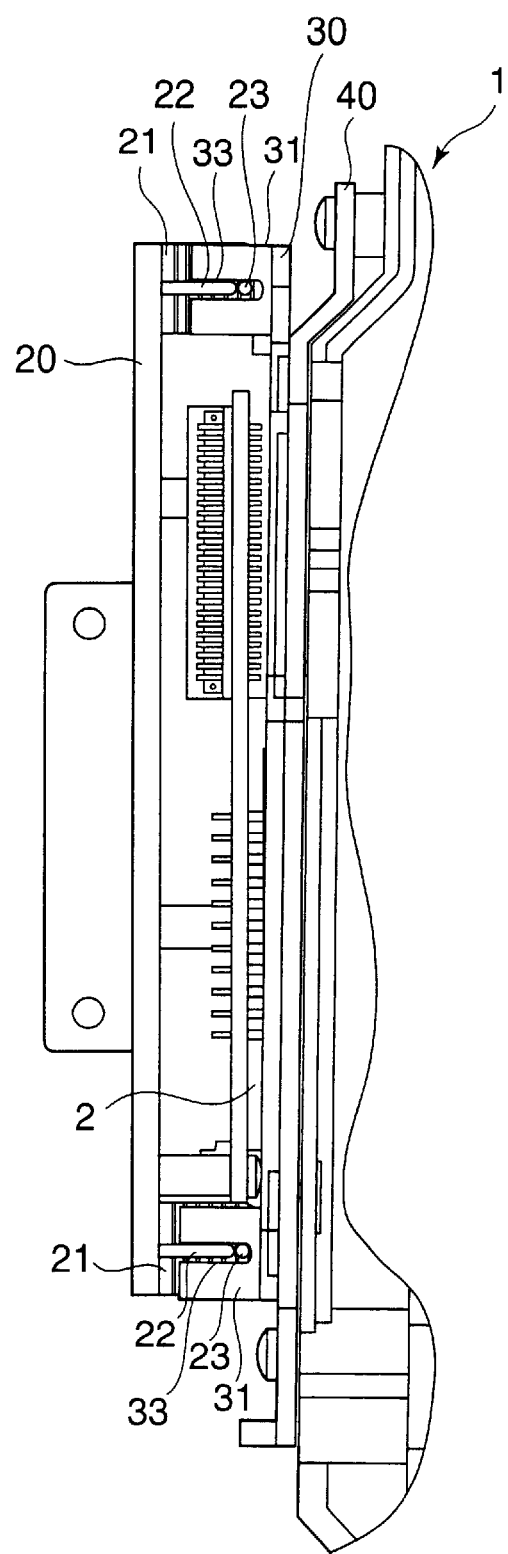
FIG. 11 is a lower front view showing that the first fixing member 20 is moved counterclockwise of adjustment movement Y-R with respect to the second fixing member 30.

FIG. 10 is a lower front view showing that a first fixing member 20 is moved clockwise of the adjustment movement Y-R with respect to the second fixing member 30, and FIG. 11 is a lower front view showing that the first fixing member 20 is moved counter clockwise of the adjustment movement Y-R with respect to the second fixing member 30.

The first fixing member 20 integrated with the image sensor 2 is held by the movement adjusting portion of the assembling adjustment jig whereas the carriage 1 main body with which the second fixing member 30 and the third fixing member 40 are assembled is held by the fixing portion of the assembling adjustment jig.

The adhesive plate portion 21 of the first fixing member 20 is in slide contact between the adhesive plate portions 31 and 32 of the second fixing member 30, and the engagement rib 22 of the first fixing member 20 is inserted into the engagement receiving portion 33 of the second fixing member 30, to thereby start the optical assembling adjustment.

In this example, the first fixing member 20 is moved in the Z-S direction described with reference to FIG. 8 in the above. Then, the movement in the direction of Y-R will be described.

The engagement rib 22 and the engagement receiving portion 33 come partially in contact with each other when moving clockwise of the Y-R direction in FIG. 10, and counterclockwise of the Y-R direction in FIG. 11, and the first fixing member 20 keeps the degree of freedom with respect to the second fixing member 30.

Further, as is understood from FIGS. 10 and 11, the adhesive hole portions 23 for allowing the adhesive of the first fixing member 20 to flow into the back surface of the adhesive plate portion 21 can be recognized from the engagement receiving portion 33 of the second fixing member 30, respectively, and there is no case in which the adhesive hole portions 23 are hidden by the shadow of the adhesive plate portion 31. With this structure, the adhesive can be surely poured between the back surface of the adhesive plate portion 21 and the surface of the adhesive plate portion 32 from the back side of the carriage 1.

Also, even if the image sensor 2 is so positioned as to be embedded in the second fixing member 30 and the third fixing member 40 at the time of adjusting the optical assembly, because those members 30 and 40 have the opening portions 36 and 43 broader than the image sensor 2, respectively, the adjustment range is not narrowed.

Figure 12:
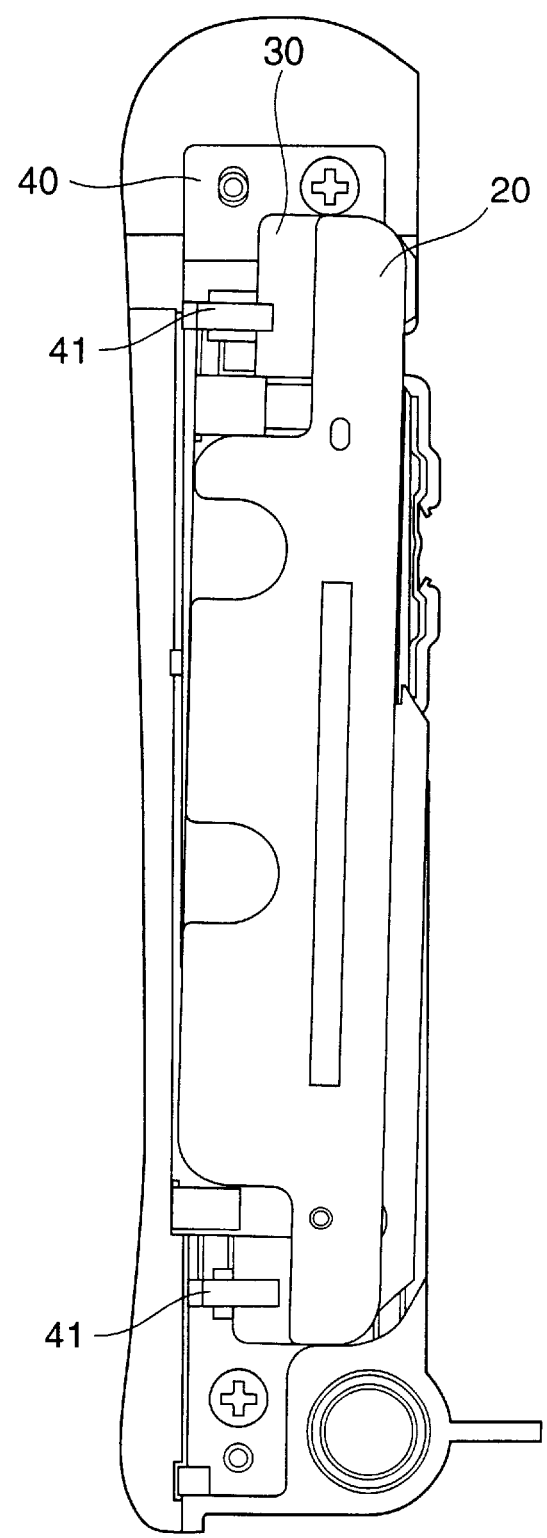
FIG. 12 is a left side view for explaining a movement of the first fixing member 20 in the adjustment movement Z-R rotating direction with respect to the second fixing member 30.
Figure 13:
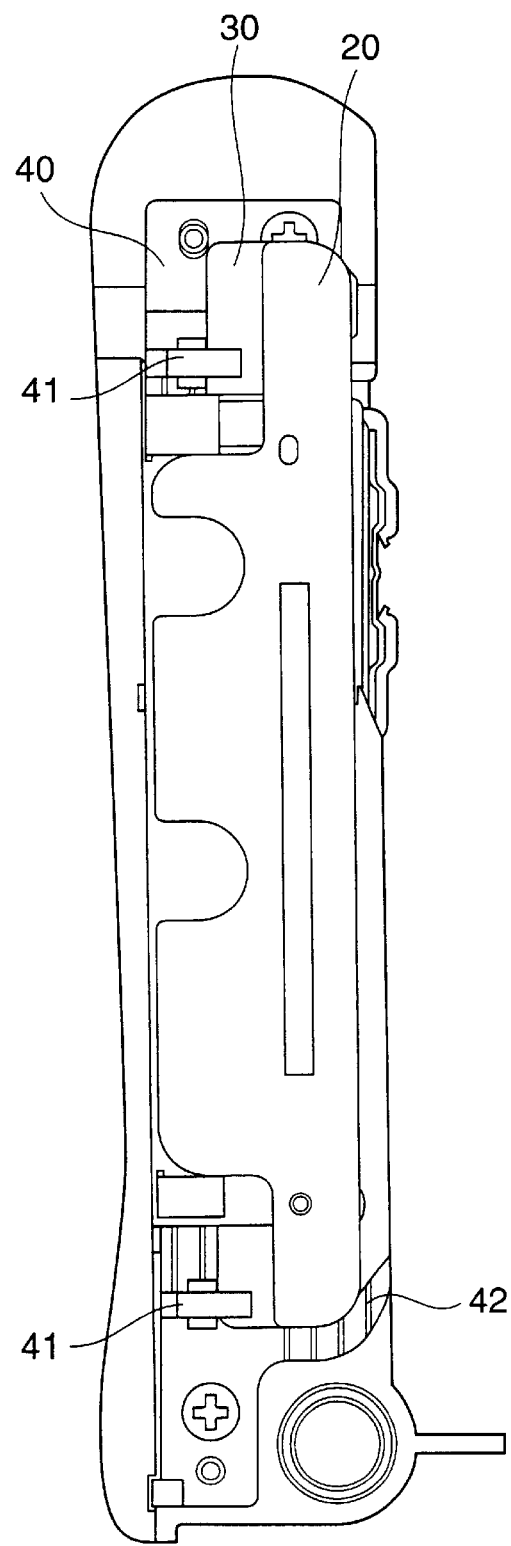
FIG. 13 is a left side view for explaining a movement of the first fixing member 20 in the adjustment movement X-S direction with respect to the second fixing member 30.

FIG. 12 is a left side view for explaining the movement of the first fixing member 20 in the adjustment movement Z-R rotating direction with respect to the second fixing member 30, and FIG. 13 is a left side view for explaining the movement of the first fixing member 20 in the adjustment movement X-S direction with respect to the second fixing member 30.

The second fixing member 30 is also moved according to the engagement relationship between the engagement rib 22 and the engagement receiving portion 33 and the slide contact relationship between the adhesive plate portion 21 and the adhesive plate portions 31 and 32 in association with the adjusting movement of the first fixing member 20 in the direction of X-S, the direction of Y-S and the direction of Z-R.

The second fixing member 30 is urged by the engagement portion 41 of the third fixing member 40 from the back side thereof, and always comes in slide contact with the adhering surface of the third fixing member 40, with the result that there is no case in which the second fixing member 30 does not limit the adjusting movement of the first fixing member 20 with respect to the third fixing member 40.

The first fixing member 20 is moved clockwise of Z-R direction as shown in FIG. 12, moved in the direction of X-S as shown in FIG. 13 and since the movement of the first fixing member 20 in the direction of Y-S is similar to that shown in FIG. 13, its description will be omitted. With the above structure, the degree of freedom of the first fixing member 20 is kept.

When the image sensor 2 integrated with the first fixing member 20 is optically adjusted and positioned with respect to the carriage 1, the processes of adhering the first, the second and the third fixing members with the adhesive are conducted.

The first fixing member 20 and the second fixing member 30, and the second fixing member 30 and the third fixing member 40 always come in slide contact with each other, respectively, that is, always have the adhering surfaces.

The enlarged cross-sectional view parts of FIGS. 4B and 4C will be described.

The adhesion of the first fixing member 20 and the second fixing member 30 is made by allowing the adhesive to pour into a gap between the engagement rib 22 and the engagement receiving portion 33 from the engagement rib 22 side.

A part of the poured adhesive is uniformly spread by the adhesive groove portion 24 in the surface of the adhesive plate portion 21, and the adhesive plate portion 21 and the adhesive plate portion 31 are fixedly adhered to each other.

Also, another part of the poured adhesive passes through the adhesive hole portion 23 through which the adhesive flows into the back surface of the adhesive plate portion 21, and reaches the adhesive plate portion 32 (receiving portion) positioned below. Since the adhesive plate portion 32 has no engagement receiving portion, there is no case in which the adhesive further flows down.

The adhesive is uniformly spread by the adhesive groove portion 24 in the back surface of the adhesive plate portion 21, thereby allowing the adhesive plate portion 21 and the adhesive plate portion 32 to adhere to each other. That is, the respective adhesive plate portions are firmly and fixedly adhered in a sandwich state.

The adhesion of the second fixing member 30 and the third fixing member 40 is conducted by pouring the adhesive into the several pouring ports 34 for pouring the adhesive into the second fixing member 30. The pouring ports 34 form notch shapes when the second fixing member 30 and the third fixing member 40 come in contact with each other so that the adhesive flows into the adhesive groove portion 35.

The poured adhesive flows along the adhesive groove portion 35 since the adhesive flows into the adhesive groove portion 35 of the second fixing member 30 with the aid of the self weight of the adhesive.

Also, since the third fixing member 40 has the adhesive groove portion 42 in a direction substantially perpendicular to the adhesive groove portion 35, the adhesive is uniformly spread over the slide contact surface, to thereby firmly fix and adhere the second fixing member 30 and the third fixing member 40. With this structure, the image sensor 2 is optically adjusted and positioned with respect to the carriage 1.

In addition, in the case where the assembling failure in which the image sensor is slightly displaced during the adhering process or the parts need to be exchanged, the structure according to this embodiment is preferable.

Although the respective fixing members are adhered and integrated together, since the fastening screw 51 to the carriage 1 of the third fixing member 40 is disposed out of the adjusting range of the first fixing member 20 and the second fixing member 30, or on a step portion so as to be removable without interfering with the other parts, only the fixing member portions integrated together may be removed.

In other words, the image reading unit main body with which the lens unit and so on are assembled can be simply recycled as it is, and the electric substrate on which the image sensor 2 can be also simply recycled by removing the fastening screw 52 of the first fixing member 20.

Also, taking into consideration the spread of the adhesive within the groove portion 35 of the second fixing member and the groove portion 42 of the third fixing member, it is preferable that the kinematic viscosity ν of the adhesive is set to $1.0 \times 10^{-3}$ to $2.0 \times 10^{-6}$ (m²/s). The kinematic viscosity ν can be represented by the following expression.

$$\nu = \mu/\rho$$

$\mu$=the dynamic viscosity of fluid (Pa·s)
$\rho$=the density of fluid (kg/m³)

The use of the adhesive having the above kinematic viscosity can make the spread of the adhesive within both groove portions 35 and 42 good, thereby being capable of improving the adhesiveness of the second fixing member and the third fixing member.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading unit which is attached onto an image reading apparatus, comprising:
   a first unit having photoelectric conversion means for photoelectrically converting image information of an original;
   a second unit which can be engaged with said first unit; and
   a fastening member which fastens said second unit to an image reading unit main body,
   wherein said first unit is engaged with said second unit, which is fastened to the image reading unit main body by said fastening member, and after a first plane portion provided in said first unit and a second plane portion provided in said second unit are brought in close contact with each other, said first unit is fixed to said second unit with an adhesive,
   wherein a groove into which said adhesive is poured is formed in at least one of regions in which said first plane portion and said second plane portion are adhered to each other, and
   wherein said second unit is removable from the image reading unit main body by manipulating said fastening member after the adhesion.

2. An image reading unit according to claim 1, where said first plane portion and said second plane portion have a first groove and a second groove, respectively.

3. An image reading unit according to claim 2, wherein said first groove crosses said second groove.

4. An image reading unit according to claim 3, wherein said first groove is linear.

5. An image reading unit according to claim 4, wherein said first groove comprises a plurality of grooves.

6. An image reading unit according to claim 5, wherein said first groove is formed in said first plane portion over an external of said regions.

7. An image reading unit according to claim 3, wherein said second groove is linear.

8. An image reading unit according to claim 7, wherein said second groove comprises a plurality of grooves.

9. An image reading unit according to claim 8, wherein said second groove is formed in said second plane portion over an external of said regions.

10. An image reading unit according to claim 3, wherein said first groove and said second groove are linear, respectively.

11. An image reading unit according to claim 10, wherein each of said first groove and said second groove comprises a plurality of grooves.

12. An image reading unit according to claim 11, wherein said first groove and said second groove are formed in said first plane portion and said second plane portion over an external of said regions.

13. An image reading unit according to claim 1, wherein said groove is formed in at least one of said first plane portion and said second plane portion over an exterior of said regions.

14. An image reading unit according to any one of claims 1 to 13, wherein in a state that said second unit which is engaged with said first unit is attached onto a main body of said image reading apparatus, after a relative position of said first unit with respect to the main body of said image reading apparatus is adjusted, said first unit is fixed to said second unit.

15. An image reading unit according to claim 14, wherein said first unit comprises a first fixing member to which said photoelectric conversion means is fixed, and a second fixing member which is engageable with said first fixing member.

16. An image reading unit according to claim 15, wherein in a state that said second fixing member which is engaged with said first fixing member is engaged with said second unit, and in a state that said second unit is attached onto the main body of said image reading apparatus, after a relative position of said first fixing member with respect to said second fixing member is adjusted, said first fixing member is fixed to said second fixing member with an adhesive.

17. An image reading apparatus, comprising:
a first unit having photoelectric conversion means for photoelectrically converting image information of an original;
a second unit which can be engaged with said first unit; and
a fastening member which fastens said second unit to an image reading unit main body,
wherein said first unit is engaged with said second unit, which is fastened to the image reading unit main body by said fastening member, and after a first plane portion provided in said first unit and a second plane portion provided in said second unit are brought in close contact with each other, said first unit is fixed to said second unit with an adhesive,
wherein a groove into which said adhesive is poured is formed in at least one of regions in which said first plane portion and said second plane portion are adhered to each other, and
wherein said second unit is removable from the image reading unit main body by manipulating said fastening member after the adhesion.

18. An image reading apparatus according to claim 17, where said first plane portion and said second plane portion have a first groove and a second groove, respectively.

19. An image reading apparatus according to claim 18, wherein said first groove crosses said second groove.

20. An image reading apparatus according to claim 19, wherein said first groove is linear.

21. An image reading apparatus according to claim 20, wherein said first groove comprises a plurality of grooves.

22. An image apparatus according to claim 21, wherein said first groove is formed in said first plane portion over an external of said regions.

23. An image reading apparatus according to claim 19, wherein said second groove is linear.

24. An image reading apparatus according to claim 23, wherein said second groove comprises a plurality of grooves.

25. An image reading apparatus according to claim 24, wherein said second groove is formed in said second plane portion over an external of said regions.

26. An image reading apparatus according to claim 19, wherein said first groove and said second groove are linear, respectively.

27. An image reading apparatus according to claim 26, wherein each of said first groove and said second groove comprises a plurality of grooves.

28. An image reading apparatus according to claim 27, wherein said first groove and said second groove are formed in said first plane portion and said second plane portion over an external of said regions.

29. An image reading apparatus according to claim 17, wherein said groove is formed in at least one of said first plane portion and said second plane portion over an exterior of said regions.

30. An image reading apparatus according to any one of claims 17 to 29, wherein in a state that said second unit which is engaged with said first unit is attached onto a main body of said image reading apparatus, after a relative position of said first unit with respect to the main body of said image reading apparatus is adjusted, said first unit is fixed to said second unit.

31. An image reading apparatus according to claim 30, wherein said first unit comprises a first fixing member to which said photoelectric conversion means is fixed, and a second fixing member which is engageable with said first fixing member.

32. An image reading apparatus according to claim 31, wherein in a state that said second fixing member which is engaged with said first fixing member is engaged with said second unit, and in a state that said second unit is attached onto the main body of said image reading apparatus, after a relative position of said first fixing member with respect to said second fixing member is adjusted, said first fixing member is fixed to said second fixing member with an adhesive.

* * * * *

UNITED STATES PATENT AND TRADEMARK OFFICE
CERTIFICATE OF CORRECTION

| | |
|---|---|
| PATENT NO. | : 6,831,760 B2 |
| APPLICATION NO. | : 09/800654 |
| DATED | : December 14, 2004 |
| INVENTOR(S) | : Koji Kimura |

Page 1 of 1

It is certified that error appears in the above-identified patent and that said Letters Patent is hereby corrected as shown below:

<u>COLUMN 2</u>

Line 50, "become" should read --become apparent--; and
    Line 61, "lower;" should read --lower front;--.

<u>COLUMN 4</u>

Line 45, "lower." should read --lower front.--.

<u>COLUMN 7</u>

Line 15, "becomes" should read --become--; and
    Line 16, "YR" should read --Y-R--.

<u>COLUMN 10</u>

Line 28, "where" should read --wherein--.

Signed and Sealed this

Twenty-seventh Day of May, 2008

JON W. DUDAS
*Director of the United States Patent and Trademark Office*